Patented Oct. 30, 1923.

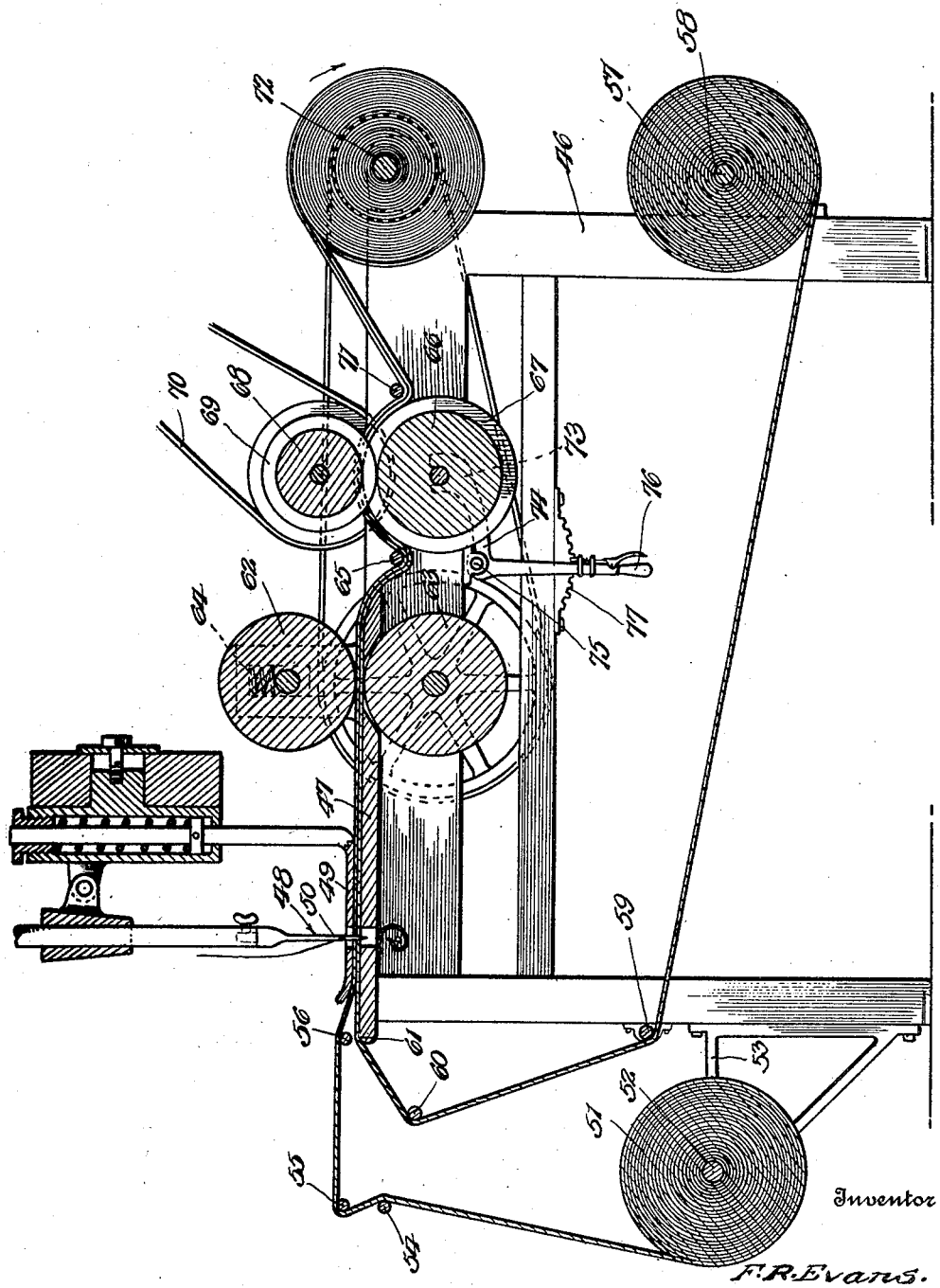

1,472,410

UNITED STATES PATENT OFFICE.

FRANK R. EVANS, OF ZANESVILLE, OHIO.

CLOTH STITCHING AND CUTTING MACHINE.

Application filed April 4, 1921. Serial No. 458,335.

*To all whom it may concern:*

Be it known that I, FRANK R. EVANS, a citizen of the United States, residing at Zanesville, in the county of Muskingum and State of Ohio, have invented certain new and useful Improvements in Cloth Stitching and Cutting Machines, of which the following is a specification.

This invention relates to improvements in cloth working machines and more particularly to a combined machine for longitudinally stitching cloth and simultaneously cutting the same into strips, the purpose of the invention being to prepare strips from which gauntlet cuff blanks may be cut although the principles of the invention are applicable to many other uses.

Heretofore in making cuff blanks for the manufacture of gauntlets where each blank comprises two or more plies as for example a facing ply and a lining or stiffening ply, it has been the usual practice to cut the plies by means of a die machine from a number of sheets of cloth arranged in a pile. After the blank plies have been cut in this manner, it has been necessary to assemble them by hand and bring their margins into registration after which the plies comprising each blank have been stitched together or otherwise united. This old method has consumed considerable time and involved much labor and it presents the further disadvantage that care must be exercised to properly register the margins of superposed plies in assembling the plies to form the composite blank.

The present invention therefore has as one of its primary objects to provide a machine so constructed and operating in such a manner that two or more superposed sheets of cloth fed therethrough will be stitched together along suitably spaced longitudinal lines and the cloth is simultaneously slit or divided into strips of the required width, which strips may be subsequently cut into suitable lengths to form the blanks. By this method the several plies are securely united by the lines of stitching simultaneously with the cutting of the cloth into strips so that registration of the margins of the strips is automatically effected and true parallelism is maintained between the lines of stitching and the lines of incision which divide the cloth into the several strips.

In the accompanying drawings, the figure is a vertical longitudinal sectional view through the machine embodying the invention.

In this figure the numeral 46 indicates in general the frame of the machine and 47 indicates the bed plate thereof. The stitching mechanism is indicated in general in this figure by the numeral 48 and embodies the usual presser foot 49 and needle 50, both operating above the bed plate 47. In carrying out the invention a roll 51 of cloth which is to serve as the facing material of the blanks is supported at the front of the machine as for example upon a shaft 52 mounted in suitable bearing brackets 53, and the cloth is led from this roll over the rear side of a stationary tensioning roll or rod 54, thence over the forward and upper sides of a similar tensioning rod 55 arranged above the rod 54, and then over the upper side of a similar rod 56 arranged above the forward edge of the bed plate 47 and in spaced relation thereto from which point the cloth passes beneath the presser feet 49 of the several stitching assemblages, of which any desired number may be employed. The material which is to comprise the lining or stiffening plies of the finished blanks is led from the roll 57 mounted for example upon the shaft 58 upon the rear side of the frame 46 of the machine and forwardly and upwardly over the tensioning roll or rod 59 upon the front of the said frame from which point the cloth is led over a similar rod or roll 60 and thence as at 61 over the forward edge of the bed plate 47, passing in a flat and smoothly tensioned condition over the surface of this plate and beneath the presser feet 49 and likewise beneath the material which is led from the roll 51. It will be observed by reference to the drawing that the cloth from the roll 57 passes beneath the tensioning rod 56 which rod is as stated suitably spaced above the upper surface of the bed plate 47 so that up to the time the two stretches of cloth are passed beneath the presser foot 49, they are substantially out of contact and neither can therefore exert any distorting strain upon the other.

The two plies of cloth are fed continuously past the several stitching assemblages and over the upper surface of the bed plate 47 by being drawn between upper and lower feeding rolls, indicated respectively by the numerals 62 and 63, these rolls being mounted respectively above and below the said bed plate 47 with their adjacent peripheral portions engaging and receiving between them the cloth plies in the plane of the upper surface of this plate. The roll 63 is driven in any suitable manner and the roll 62 is maintained in frictional contact with the cloth plies and suitably tensioned with relation to the roll 63 as for example by springs 64 acting against its end bearings or journals. After passing the rolls 62 and 63, the cloth plies are led beneath a tensioning roll or rod 65 mounted transversely in the frame of the machine and thence over an idle roll 66 formed at suitable intervals with circumferential grooves 67, and cooperating with this roll 66 is a roll 68 which carries a plurality of spaced circular knives 69 operating at their peripheral portions within the grooves 67 of the roll 66. The roll 68 may be rotated in any suitable manner as for example by a belt 70 operated from any suitable source of power and after the cloth plies leave the roll 66 they are passed beneath a tensioning rod or roll 71 and are finally wound upon a shaft 72 demountably supported at the rear of the frame of the machine and rotated in any desired manner. It is preferable that the roll 66 be supported in bearings 73 provided at the ends of supporting arms 74 which extend rearwardly from a shaft 75 mounted in the frame of the machine and these arms, or the shaft upon which they are fixed, are adapted to be rocked through the medium of a hand lever 76 connected either with one of the arms or with the said shaft and adapted to be held in positions of adjustment by means of a segmental rack or other suitable means indicated by the numeral 77. By thus mounting the roll 66, the same may be dropped or lowered from operative relation to the knife roll 68 so as to permit of arrangement of the cloth plies between these rolls in the event this becomes necessary during the operation of the machine.

From the foregoing description of the invention it will be understood that as the two plies of cloth from the rolls 51 and 57 are passed over the surface of the bed plate 47 and beneath the presser feet 49, they will be united between suitably spaced lines of stitching and as they pass beneath the tensioning rods or rolls 65 and 71 by which they are held smoothly and properly tensioned over the upper surface of the grooved roll 66, they are acted upon by the knives 69 and are cut longitudinally into a plurality of strips, which strips after leaving the rod or roll 71, are wound upon the shaft 72.

Having thus described the invention, what is claimed as new is:

In a machine of the class described, a bed plate, feed rolls journaled above and below the plane of the bed plate and having coacting peripheral portions for engaging and advancing material over the bed plate, a roll having peripheral blades, the said roll being rotatably mounted beyond the bed plate, means for rotating the said roll, a shaft extending parallel to the axes of the several rolls and located in a plane below the bed plate, a hand lever connected with the shaft whereby the shaft may be rotatably adjusted, means for holding the hand lever in positions of adjustment, arms extending from the shaft, bearings at the ends of the arms, a roll having trunnions journaled in the said bearings and located beneath the last mentioned roll and movable, upon adjustment of the shaft, into and out of coactive relation thereto, the last mentioned roll having peripheral grooves to receive the cutting edges of the blades upon the blade-carrying roll, a take-up roll, and guide rods extending longitudinally parallel to and at opposite sides of the upper surface of the grooved roll and tensioning the material passing therebeneath and over the said grooved roll to the take-up roll.

In testimony whereof I affix my signature.

FRANK R. EVANS. [L. S.]